United States Patent Office 3,457,060
Patented July 22, 1969

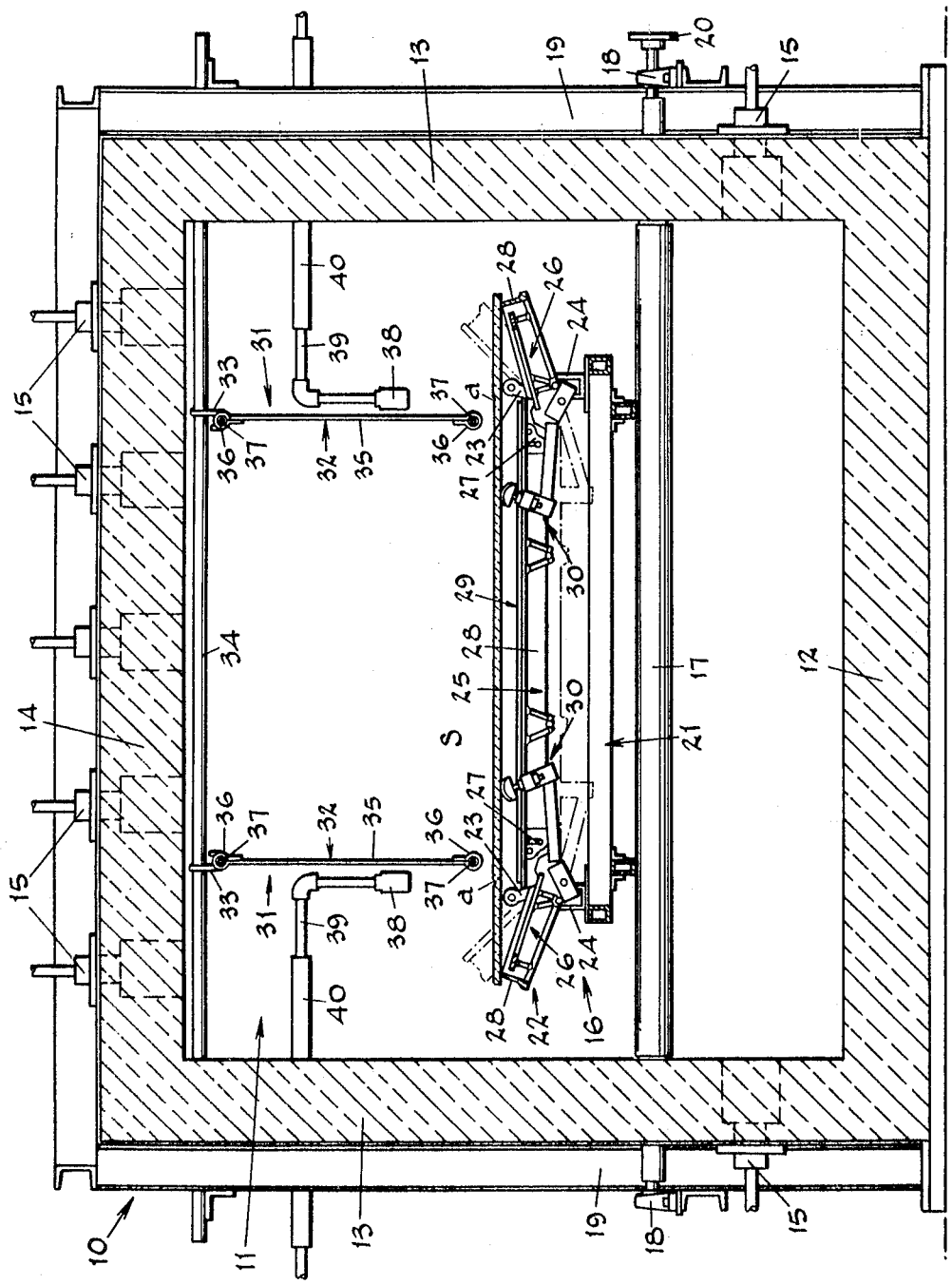

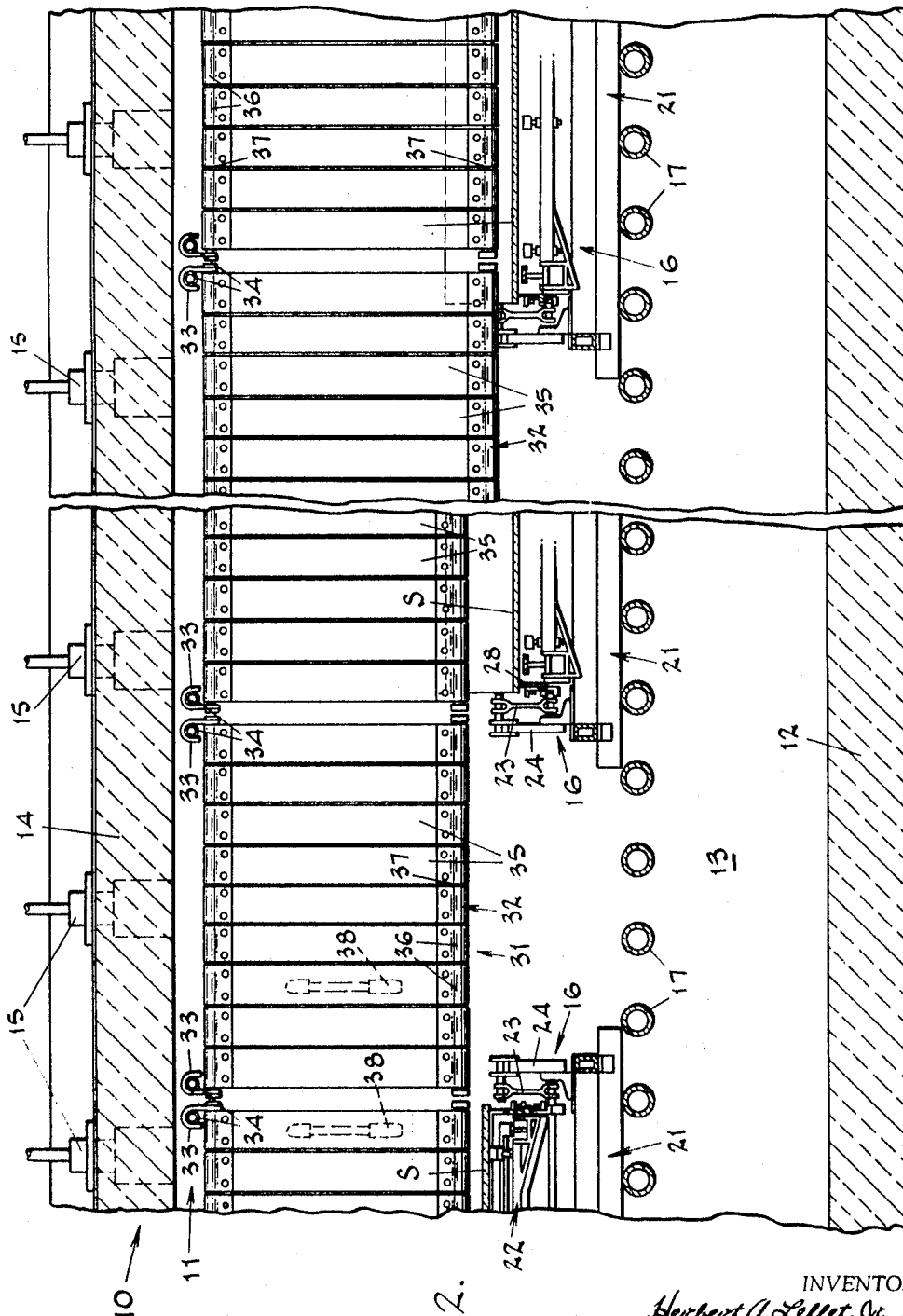

3,457,060
GLASS BENDING FURNACE WITH PARTITIONS DEFINING SEPARATE LONGITUDINALLY DISPOSED HEATING AREAS
Herbert A. Leflet, Jr., and David M. Wampler, Toledo, Ohio, assignors to Libbey-Owens-Ford Company, Toledo, Ohio, a corporation of Ohio
Filed Mar. 23, 1966, Ser. No. 536,751
Int. Cl. C03c 23/00; C03b 27/00, 23/02
U.S. Cl. 65—288                                    3 Claims

ABSTRACT OF THE DISCLOSURE

Partitions provided within a glass sheet bending furnace effectively divide the furnace into separate heating areas extending parallel to the path of sheet movement. The partitions are suspended from adjacent the roof of the furnace and extend downward close to the sheet surface, permitting heat to be concentrated in certain areas of the sheet with a minimum effect on adjacent areas.

The present invention relates broadly to the bending of sheets or plates of glass and more particularly to improvements in glass bending furnaces.

In the bending of glass sheets or plates it is customary to support a flat sheet to be bent upon a shaping surface of a bending mold and to then pass the mold and sheet through a furnace. During the passage of each of a plurality of molds through the bending furnace, the glass sheets supported thereon are heated to bending temperature at which they sag into conformity with the shaping surfaces of the molds.

The heating of the sheets during the passage through the bending furnace is normally accomplished by the provision of gas burners and/or electric heaters located above and/or below the path of travel of the molds and spaced from or within the furnace walls.

Present day production requirements in the field of glass, often require that some portions of the glass sheet be bent to rather sharply defined curvatures. In fact some requirements dictate that some portions of a glass sheet be bent to an angle approaching 90° relative to other portions of the sheet.

It has been found that it is difficult, if not impossible, to provide sufficient heat to selected portions of the sheet to bend them to the desired severe curvatures without overbending the remaining portions. Thus, in an effort to supply sufficient heat to allow the selected portions of the sheet to be bent to relatively sharp curvatures, the remaining portions are heaated to such an extent that excessive overbending will occur in the remaining portions.

The principal object of this invention, therefore, resides in the provision of improved means for controlling the heat supplied to a furnace to provide a desired heating pattern to selected portions of the sheet to be bent.

Another object is to provide a glass bending furnace having heating means for supplying heat to the heating chamber with means for confining the heat to selected portions of the sheet.

A further object is to provide a bending furnace having means for dividing the transverse area thereof into chambers with means for supplying heat to selected portions of the sheet below an associated chamber.

Other objects and advantages of the invention will become more apparent during the course of the following description when read in connection with the accompanying drawings.

In the drawings, wherein like numerals are employed to designate like parts throughout the same:

FIG. 1 is a transverse vertical sectional view of a glass bending furnace having the features of the present invention incorporated therein; and FIG. 2 is a vertical longitudinal fragmentary sectional view of the bending furnace shown in FIG. 1.

Although a bending furnace, constructed in accordance with this invention, has a variety of uses, it is particularly adapted to bend sheets of glass which require severe curvatures at selected portions of the sheet while the remaining portions are flat or of a rather shallow curvature. Examples of such bent sheets include the so-called "panoramic" windshield, the one piece bay window and a flat sheet which is bent to a sharp angle along a portion thereof. While not limiting the scope of the invention, it will be described in connection with bending a one piece bay window from a blank size glass sheet.

Referring now to the drawings, there is shown a glass bending furnace 10 having the features of the present invention incorporated therein. The furnace 10 comprises an elongated tunnel type heating chamber 11 which is formed by a bottom wall 12, side walls 13 and a top wall 14, respectively, with all of the walls formed with a suitable heat resistant material. The walls of the furnace are conventionally provided with heating means, such as radiant gas burners 15 arranged in the top and side walls of the furnace.

The glass sheets S to be bent are supported upon a bending apparatus 16, which is carried through the heating chamber of the furnace by a suitable conveying means such as horizontally disposed conveyor rolls 17. As shown in FIG. 1, the opposite ends of each conveyor roll extend through the side walls of the heating chamber and are journaled in bearings 18 mounted exteriorly of the side walls 13 on the furnace frame structure 19. Preferably each of the rolls is provided with a sprocket 20 which, by means of a sprocket chain or equivalent device, is driven by a suitable power source.

The bending apparatus 16 may be of a variety of conventional types having either a convex or concave shaping surface formed thereon. While in no way restricting the invention, it has been of particular value in bending glass sheets on a so-called peripheral or outline type bending apparatus capable of bending a blank size glass sheet to a configuration having a flat central portion and outer edge or wing portions bent to rather sharply defined angles with respect to the central portion. By way of example, the bending apparatus 16 may comprise a rack 21 which carries an articulated outline type bending mold 22 by links 23 pivotally supported on the rack by vertical posts 24. The illustrated mold includes a central section 25 and oppositely disposed end sections 26 movably connected to the opposite ends of the center section by hinges 27 so that the mold sections may move from an open position, shown by the solid lines of FIG. 1, to a closed position, shown by the phantom lines in FIG. 1. The sections 25 and 26 include rails 28 having relatively narrow upper surfaces which are finished to form a shaping surface 29 adapted to receive a glass sheet, when bent, in contact therewith.

As shown in FIG. 1, when a large flat sheet of glass to be bent is initially positioned on the bending mold, it is supported by the shaping surface at its opposite sides and intermediate its ends by support means 30 carried by the end sections 26. Therefore, when a glass sheet supported on the mold is heated to the bending temperature of the glass, the support means 30 will prevent the central portion from sagging downwardly before the mold sections begin to move relative to each other.

To aid in bending and reduce distortion adjacent the relatively sharp bend produced in a blank size glass sheet, the sheet is provided with grooves a (FIG. 1) located along the lines of bend of the sheet. These grooves establish lines of weakened resistance to insure that the sheet will bend along these lines and at the same time reduce distortion in the finished unit by minimizing the stress imparted to the sheet along the bend lines.

In establishing a heating pattern within the furnace, the heating means, or sources 15, are controlled to gradually raise the temperature of the atmosphere from atmospheric temperature at the entrance end of the furnace to a temperature corresponding to the bending temperature of the glass at the exit end thereof. This may be accomplished by progressively increasing the amount of heat supplied to successive areas or zones along the length of the heating chamber. As the sheets are carried through the furnace, they will be gradually brought to bending temperature and caused to sag down gradually into conformity with the mold as the mold closes.

However, in prior operation of the type of furnace outlined above, in order to bend selected portions of glass sheets to relatively sharp curvatures, it was considered necessary to heat the entire sheet to bending temperature to cause the selected portion to sag into conformity with the associated portion of the shaping surface of the mold in the short time during which the mold is passing through the furnace. This, of course, resulted in the remaining portions of the sheet also being heaated to bending temperature and this amount of heat in the remaining portions of the sheet resulted in excessive overbending of these portions.

Overbending is, of course, undesirable since it may cause distortion upon viewing an object through the finished unit.

To minimize, if not eliminate, these objections the present invention contemplates providing means for confining the heat supplied to the furnace to selected portions of the sheet to raise the temperature of these portions to a point above that of the remaining portions. For example, the invention contemplates heating the sheet to a temperature slightly below the bending temperature in a furnace of the above type and supplying additional heat to selected portions of the furnace and restricting this additional heat to selected portions of a glass sheet which is to be bent to relatively sharp curvatures to bring these portions to bending temperature while retaining the remaining portions of the sheet at a relatively lower temperature. In this way, the entire sheet may be brought up to a temperature that will permit the selected portions to bend without causing sufficient temperature differential in adjacent areas to crack the sheet.

As illustratively shown in the drawings, confining or restricting means is in the form of vertical barriers 31 which divide the width of the heating chamber above the shaping surface into longitudinally extending sections. The barrier means include a plurality of individual curtain members 32 each of which is supported at its upper end by U-shaped brackets 33 on bars 34 extending transversely of the heating chamber. The bars 34 project through the side walls adjacent the top wall of the furnace and are supported on the furnace frame structure. The curtain members are aligned longitudinally on opposite sides of the longitudinal center of the furnace in the area along its length where the sheets begin to sag downwardly into conformity with the shaping surface of the mold. As can be seen in FIG. 1, the curtain members are hung on the bars by the U-shaped brackets so that they may be readily moved transversely of the heating chamber to conveniently vary the heat pattern to any given portion of the sheets to be bent.

As illustratively shown in FIG. 2, each curtain member 32 may include a plurality of strips of heat resistant material 35 provided with loops 36, their opposite ends received on rods 37 with the brackets 33 carried by the opposite ends of the upper rods 37. The curtain members may be formed of any of a variety of insulating materials such as glass cloth, Marinite or insulating metal.

In order to bend selected portions of a glass sheet to severe curvatures without overheating the remaining portions of the sheet, additional heating means are provided only in the chambers which are disposed above a selected portion of the sheet which will have the severe bend. In the illustrative embodiment, the additional heating means are provided outwardly of the shields adjacent the walls of the heating chamber along a portion of the longitudinal length of the furnace particularly in the area where the glass sheets begin to bend. Any number of different types of heating means may be utilized, such as additional burners disposed in the side walls of the furnace. However, it is preferable to have the heating means in close proximity to the portion of the glass sheet to be heated.

Thus, in the illustrative embodiment, the additional heating means include a second heating means or heating elements 38, which may be gas stinger burners, or electric heaters carried by rods 39 which in turn are slidably received in tubular members 40 projecting through the side walls of the furnace. In this manner, additional heat may be supplied directly to selected portions of the sheets by additional heating means disposed below a selected chamber and the curtain members will prevent the additional heat from mingling with the heat supplied to the remaining portions of the sheet disposed below other chambers in the furnace.

In the illustrative embodiment of the invention wherein a large blank size glass sheet is bent to have a relatively flat central portion and wing portions disposed at a relatively sharp angle to the center portion, it has been found desirable to locate the heating elements directly above the grooves $a$ (FIG. 1) of the sheet so that the heat will be concentrated in this area.

Furthermore, the barriers 31 are located slightly inwardly of the grooves so that the additional heat will be restricted to the outer portion of the sheet which is to be bent to the relatively sharp angle.

As can readily be appreciated, as the sheets begin to sag downwardly and the mold sections begin to move relative to each other, the space between the top wall and the top surface of the central portion of the sheet is increased. This of course will allow the additional heat supplied to the outer chambers of the furnace to pass to the adjacent chamber which will objectionably increase the temperature of a portion of the sheet below that chamber. Therefore, according to another aspect of the invention, the vertical length of the barriers is progressively increased in the area of the furnace where the sheet begins to bend so that the lower edge of the barriers is always in close proximity to the top surface of the sheet as the mold closes and moves downward, as shown in FIG. 2.

It is also desirable to eliminate any large or sharp temperature differentials in adjacent portions of the glass since the sharp changes in temperature between the adjacent portions of the sheet may cause cracking of the glass. Therefore, the lower edges of the shields may be serrated forming generally triangular teeth which thereby minimize the formation of a sharp temperature differential between adjacent portions of the sheet located on opposite sides of the shields.

As can readily be appreciated, the improved bending furnace, constructed in accordance with the invention, provides a means for producing improved quality sheets which are bent to the desired curvature and may be precisely bent to sharp curvatures in some portions of the sheet without any objectionable overbending in remaining portions of the sheet.

Although the barriers have been described as a plurality of flexible curtain members formed by strips of material, it is to be understood that it is within the spirit of the invention to form the barriers in any desirable manner so long as they are of the type which will restrict heat to a selected chamber.

In fact, the form of the invention herewith shown and described is to be taken as an illustrative embodiment only of the same, and that various changes in the shape, size and arrangement of parts may be resorted to without departing from the spirit of the invention.

We claim:
1. A glass sheet bending furnace having a roof, floor and side walls defining an elongated heating chamber, a conveyor extending longitudinally through said chamber and operable to move a glass sheet bending mold therethrough, burners disposed adjacent said roof and operable to direct streams of heated gases downwardly into said chamber and toward said conveyor, supports extending transversely across said furnace adjacent said roof, a longitudinally disposed partition fixed to and depending from said supports toward said conveyor with the lowermost end thereof being spaced a preselected distance above said conveyor thereby to provide clearance for the bending mold to move therebeneath, said partition being movable on said supports to divide said chamber above said conveyor into distinct longitudinally disposed heating areas of variable relative size, each of which may be heated to a different temperature by said burners.

2. Apparatus for bending glass sheets including, in combination, a tunnel-type furnace, means for heating said furnace, a conveyor extending longitudinally through said furnace, a bending mold of the type comprising a base member and articulated mold sections suspended from links attached to said base member, whereby said mold sections move downward with respect to said base member as the mold shifts from an open to a closed configuration as it moves through said furnace on said conveyor, and a partition vertically disposed within said furnace parallel to its longitudinal axis to divide it into sections, said partition being suspended from adjacent the roof and extending downward to a level closely adjacent to the shaping surface of said mold, the vertical length of said partition being progressively increased from the entrance to the exit end of said furnace coincident with the shifting of the mold from an open to a closed configuration such that the distance between said shaping surface and said partition remains substantially constant throughout the furnace.

3. Apparatus for bending glass sheets as defined in claim 2, including supports extending transversely across said furnace, from which said partition is suspended, said partition being movably suspended therefrom to divide said furnace into sections of variable relative size.

References Cited
UNITED STATES PATENTS

| | | | |
|---|---|---|---|
| 1,785,264 | 12/1930 | Kingsley | 65—118 |
| 2,967,378 | 1/1961 | Jones et al. | 65—104 |
| 3,087,315 | 4/1963 | Golightly | 65—288 |
| 3,307,930 | 3/1967 | Stevens et al. | 65—288 |

S. LEON BASHORE, Primary Examiner

R. V. FISHER, Assistant Examiner

U.S. Cl. X.R.

65—107, 118, 274, 350